United States Patent
Kim et al.

(10) Patent No.: US 6,233,280 B1
(45) Date of Patent: May 15, 2001

(54) VIDEO DECODER FOR HIGH PICTURE QUALITY

(75) Inventors: Jin Kyeong Kim, Kyungki-do; Hwa Young Lyu, Seoul, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/223,752

(22) Filed: Dec. 31, 1998

(30) Foreign Application Priority Data

Dec. 31, 1997 (KR) .................................................. 97/80716

(51) Int. Cl.[7] ................................ H04B 1/66; H04N 7/12
(52) U.S. Cl. ......................................................... 375/240.21
(58) Field of Search .................................... 348/421, 422, 348/423, 426, 845, 845.1, 845.2, 845.3, 405.1, 406.2, 409.1, 416.1; 358/261.1, 261.2, 261.3, 261.4; 345/58; 708/402; 375/240, 240.01, 240.02, 240.21; H04B 1/66

(56) References Cited

U.S. PATENT DOCUMENTS

| | | | |
|---|---|---|---|
| 5,202,901 | * | 4/1993 | Chnnakeshu et al. .................. 375/84 |
| 5,278,646 | * | 1/1994 | Civanlar et al. ....................... 358/133 |
| 5,303,058 | * | 4/1994 | Fukuda et al. ......................... 358/133 |
| 5,491,515 | * | 2/1996 | Suzuki ................................ 348/401.1 |
| 5,493,514 | * | 2/1996 | Keith et al. ........................... 364/514 |
| 5,752,223 | * | 5/1998 | Aoyagi et al. ......................... 704/219 |
| 5,822,722 | * | 10/1998 | Ozawa ................................. 704/222 |

FOREIGN PATENT DOCUMENTS

| | | | | |
|---|---|---|---|---|
| 2333201 | * | 7/1999 | (GB) ............................... H04N/7/30 |
| 95563 | * | 7/1999 | (JP) ................................. H04N/7/13 |

* cited by examiner

*Primary Examiner*—Vu Le
*Assistant Examiner*—Tung Vo
(74) *Attorney, Agent, or Firm*—Fleshner & Kim, LLP

(57) ABSTRACT

A video decoder for high definition television includes a variable length decoder decoding codes corresponding to discrete cosine transform (DCT) coefficients of an applied video bit stream, and produces a run-level pair for each code. An index decoder stores run-level pairs produced from the variable length decoder, and produces the position information indicating the number of a level value of a corresponding run-level pair among 64 DCT coefficients. An inverse quantizer obtains an added value corresponding to the position information of the index decoder from a quantization matrix, and performs an inverse quantization by multiplying a quantizer level for determining a quantization step and DCT coefficient to the added value. An inverse scanner includes a plurality of memories, and inversely scanning the DCT coefficient inversely quantized and applied serially from the inverse quantizer and produces the DCT coefficient in parallel at the same time. An inverse discrete cosine transformer performs an inverse DCT (IDCT) of the DCT coefficient produced in parallel from the inverse scanner.

9 Claims, 9 Drawing Sheets

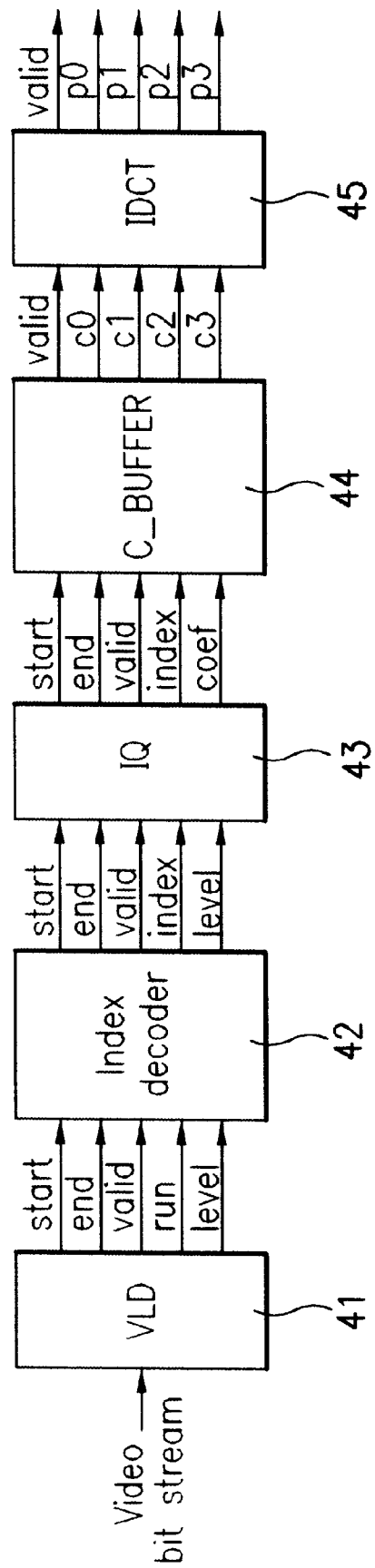

VIDEO DECODER FOR HIGH PICTURE QUALITY

BACKGROUND OF THE INVENTION

1. Field of the Invention

The present invention relates to a device which performs inverse quantization and inverse scanning at high speeds in a high picture quality video decoder for high definition displayes, preferable, and televisions.

2. Discussion of Related Art

In recent years, digital television (TV) broadcasting has been drawing much attention, and much research and development are now devoted to techniques of compressing and transmitting video data to enjoy the screen of high picture quality through televisions. The moving picture experts group-2 (MPEG-2) is normally used as algorithm for compressing video signals, and the compression rate is 1/40 to 1/60. Such algorithm is used to transmit digital data of high picture quality via general broadcasting channel. The digital TV receiver requires a video decoder for recovering the compressed input video data into original high picture quality video data. The video decoder for digital broadcasting must have a data processing rate 5 or 6 times higher compared to common-type video decoders in order to decode video signals of high picture quality.

FIG. 1 is a block diagram of a conventional video decoder which is used to process video signals of general resolution whose volume or data rate is 15 MByte per sec.

A video bit stream applied from an encoder is decoded in a variable length decoder (VLD) 11 to be divided into motion vector, quantization value, DCT coefficient.

A value corresponding to the DCT coefficient of VLD 11's output is input to inverse discrete cosine transformer (IDCT) 14 through inverse scanner (IS) 12 and inverse quantizer (IQ) 13. The VLD 11 decodes the DCT coefficient into a run-level pair. That is, a single DCT block is formed of coefficients of 8×8, and only coefficients not 0 of them are in a code. So, VLD 11 produces a level and a run as to the size of coefficients not 0, i.e., how many 0s are inserted between these coefficients.

If the first, fourth, second and third ones of 64 coefficients are 10, 3, 0, and 0, run-level is (0,10) and (3,3). This should be decoded to 10, 0, 0, 0, 3, and as shown in FIG. 2, a run-level decoder 21 is needed to change run-level pairs to 64 consecutive DCT coefficients. As shown in FIG. 3a, the decoding of 8×8 coefficients is in zigzag order so as to begin with low frequency signals in transfer to enhance the run-level code, and as shown in FIG. 3b, it is changed to a raster scanning method before IDCT 14 performs IDCT. In order to do this, as shown in FIG. 2, a memory 22 for temporarily storing DCT coefficients and an address controller 23 for providing a read/write address to memory 23 are required. Inverse scanning is carried out by changing the read/write address. Memory 22 and address controller 23 correspond to inverse scanner 12 of FIG. 1. The IQ 13 performs an inverse quantization with respect to 64 DCT coefficients produced from inverse scanner 12 after inverse scanning according to the quantization value, and produces its output to IDCT 14.

The IDCT 14 performs an IDCT with respect to the DCT coefficients inversely quantized to produce its output to a motion compensator 15. Motion compensator 15 recovers the output of IDCT 14 to a complete image by using the video signal inversely discrete cosine transformed and the motion vector separated in VLD 11, and outputs the image to display 16.

Display 16 rearranges data according to a picture type before producing, or outputs the data directly. The video decoder system based on MPEG-2 employs an external memory such as dynamic random access memory 22, and DRAM 22's blocks are divided into read of required data, write of data motion compensated and read of data to be displayed for read/write of the bit stream and motion compensation. Thus, each block of FIG. 1 has first input first output (FIFO) parts 17 to 20, and transfers and receives data via memory controller 21.

The common-type video decoder is used for processing a small volume of data but is not suitable for processing a large volume of data. That is, since the data volume is increased by six times in order to decode video data of MPEG-2 data of more than 93 MBytes per sec. must be processed, and each component has a processing rate six times as fast as the common-type video decoder of FIG. 1. In addition, the memory size and the data transfer rate used therefor must be increased.

Most DCT coefficients of the compressed bit stream are zero, and while VLD 11 requires 5 to 6 clocks to decode a single block, run-level decoder 21, producing 64 DCT coefficients, needs 64 clocks. Therefore, VLD 11 is in idle mode when run-level decoder 21 is operating, which is inefficient.

If such a structure is applied to an HDTV, the VLD, the run-level decoder, the inverse scanner, the IQ should operate at clocks of 94 MHz, which applies heavy load to the hardware since the clock frequency is too high to enabled decoding. The inverse scanning using this structure can be performed in serial only, and the internal memory write and read speeds should be very high.

SUMMARY OF THE INVENTION

Accordingly, the present invention is directed to a video decoder for high picture quality that substantially obviate one or more of the problems due to limitations and disadvantages of the related art.

An object of the present invention is to provide a video decoder for high picture quality which can perform a parallel processing when needing high-speed performance, and can consecutively process video data for a given period of time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a video decoder for high definition television including a variable length decoder decoding codes corresponding to discrete cosine transform (DCT) coefficients of an applied video bit stream, and producing a run-level pair for each code; an index decoder storing run-level pairs produced from the variable length decoder, and producing the position information indicating the number of a level value of a corresponding run-level pair among 64 DCT coefficients; an inverse quantizer obtaining an added value corresponding to the position information of the index decoder from a quantization matrix, and performing an inverse quantization by multiplying a quantizer level for determining a quantization step and DCT coefficient to the added value; an inverse scanner including a plurality of memories, and inversely scanning the DCT coefficient inversely quantized and applied serially from the inverse quantizer and producing the DCT coefficient in parallel at the same time; and an inverse discrete cosine transformer performing an inverse discrete cosine transformation (IDCT) of the DCT coefficient produced in parallel from the inverse scanner.

The video decoder of the present invention includes first and second buffers that each consist of a plurality of memories and selectively write applied data into the memories by providing a different write enable signal to each memory while commonly providing data and write address to the plural memories, and commonly applies the read address and read enable signal to a plurality of the memories, thus reading data out of the memories at the same time, and producing the data in parallel. The buffer controller generates a write/read address and a write/read enable signal of the memories by using valid and index signals to write the inversely quantized DCT coefficients into a plurality of the memories one by one, and to simultaneously read the DCT coefficients from the memories.

The buffer controller generates the write/read address and the write enable signal to write 0 into a position where the data is read, simultaneously with reading the data from one coefficient buffer. When reading data from one coefficient buffer, 64 DCT coefficients with 0 that have been already written are all read out.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

In the drawings:

FIG. 4 is a block diagram of a video decoder for high picture quality in accordance with the present invention;

FIGS. 5(a) to 5(k) each depict input/output waveforms of index decoder; illustrated in FIG. 4.

Figure 6:
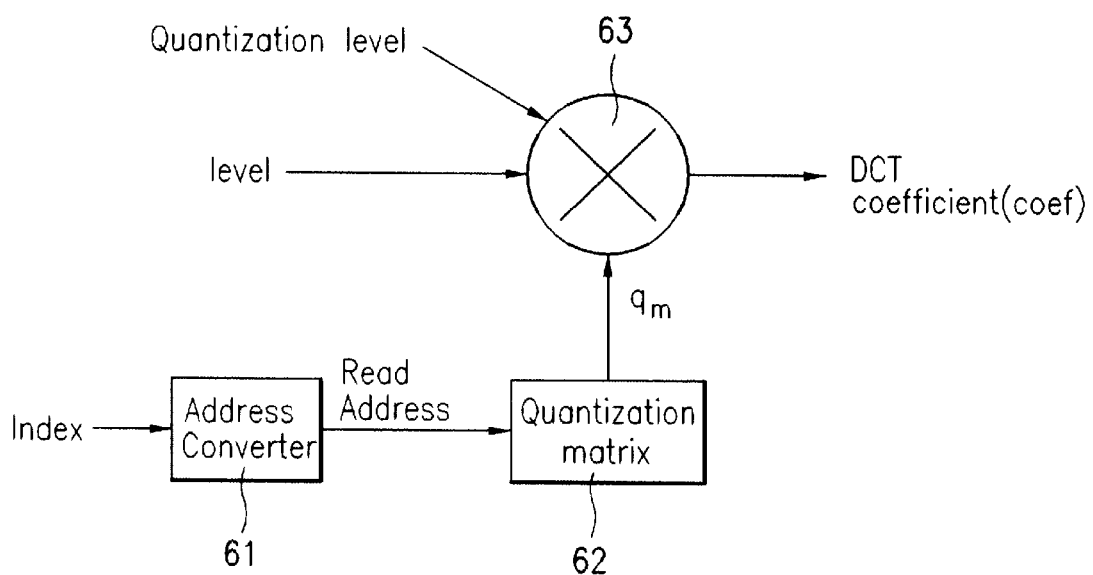
Figure 7:
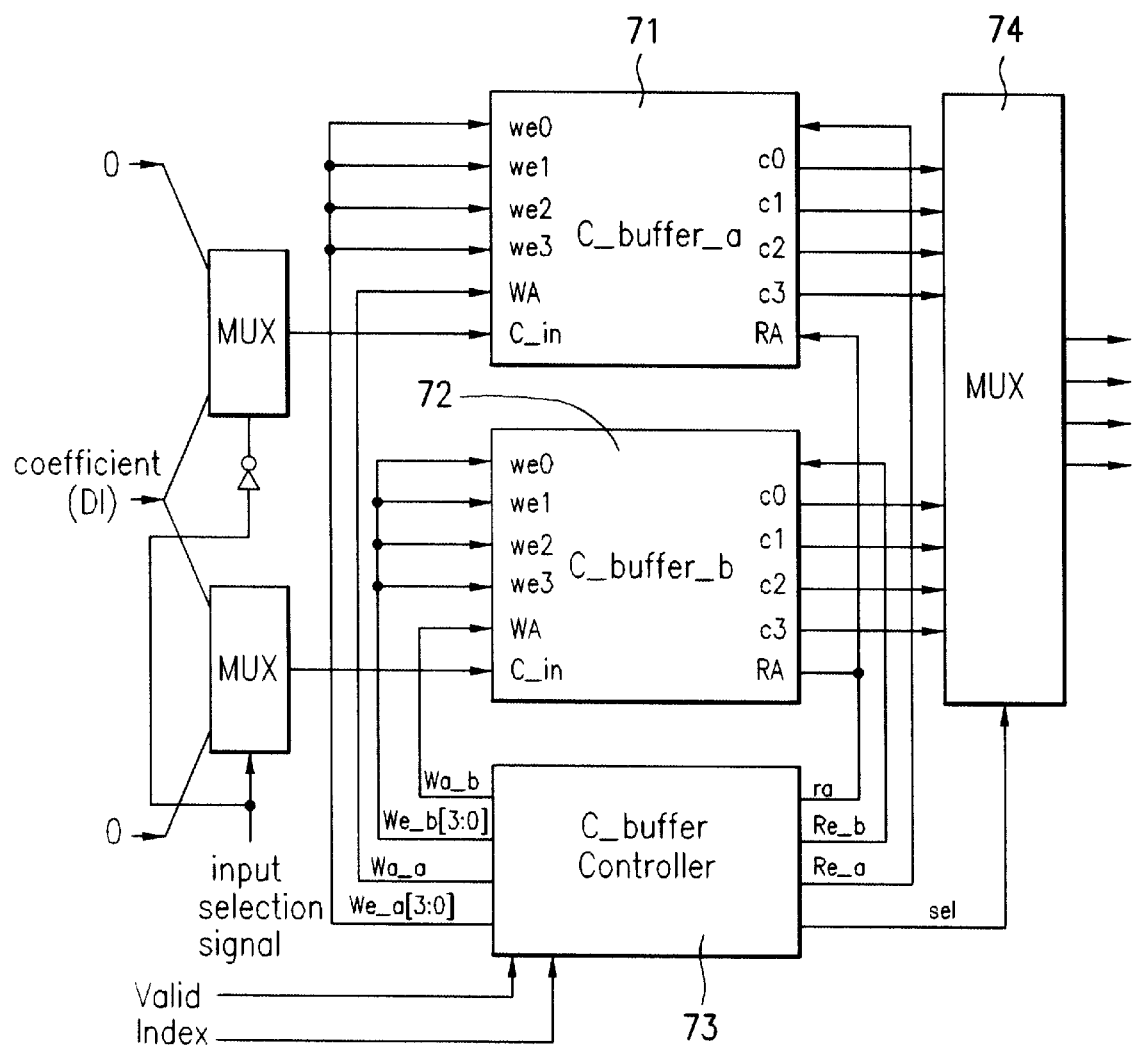
Figure 8:
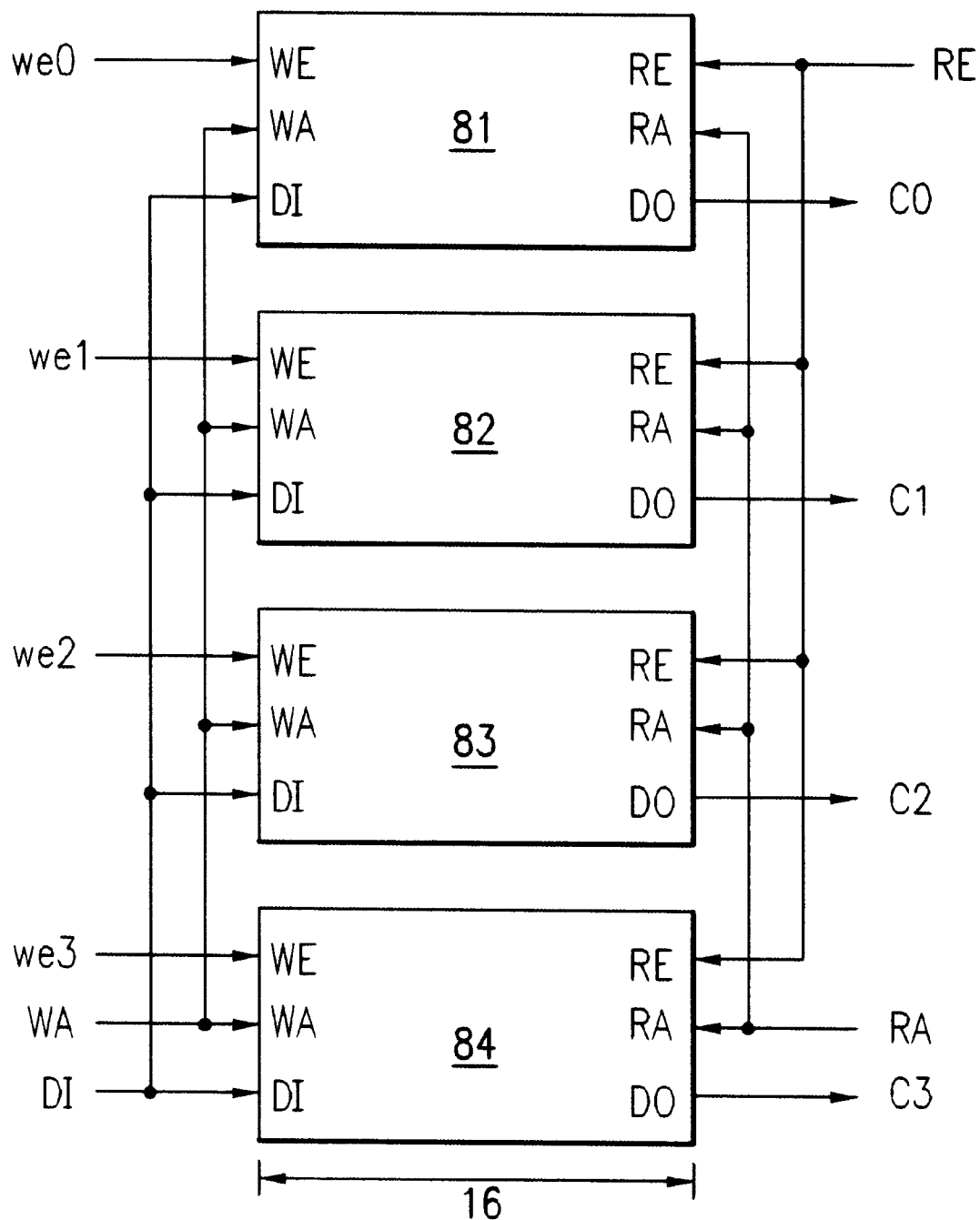
Figure 9:
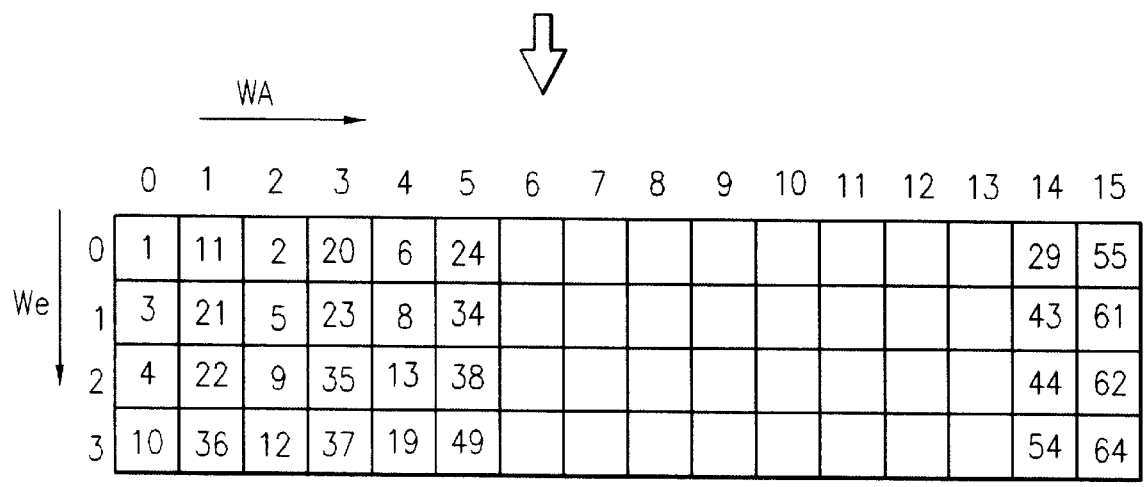
Figure 10:
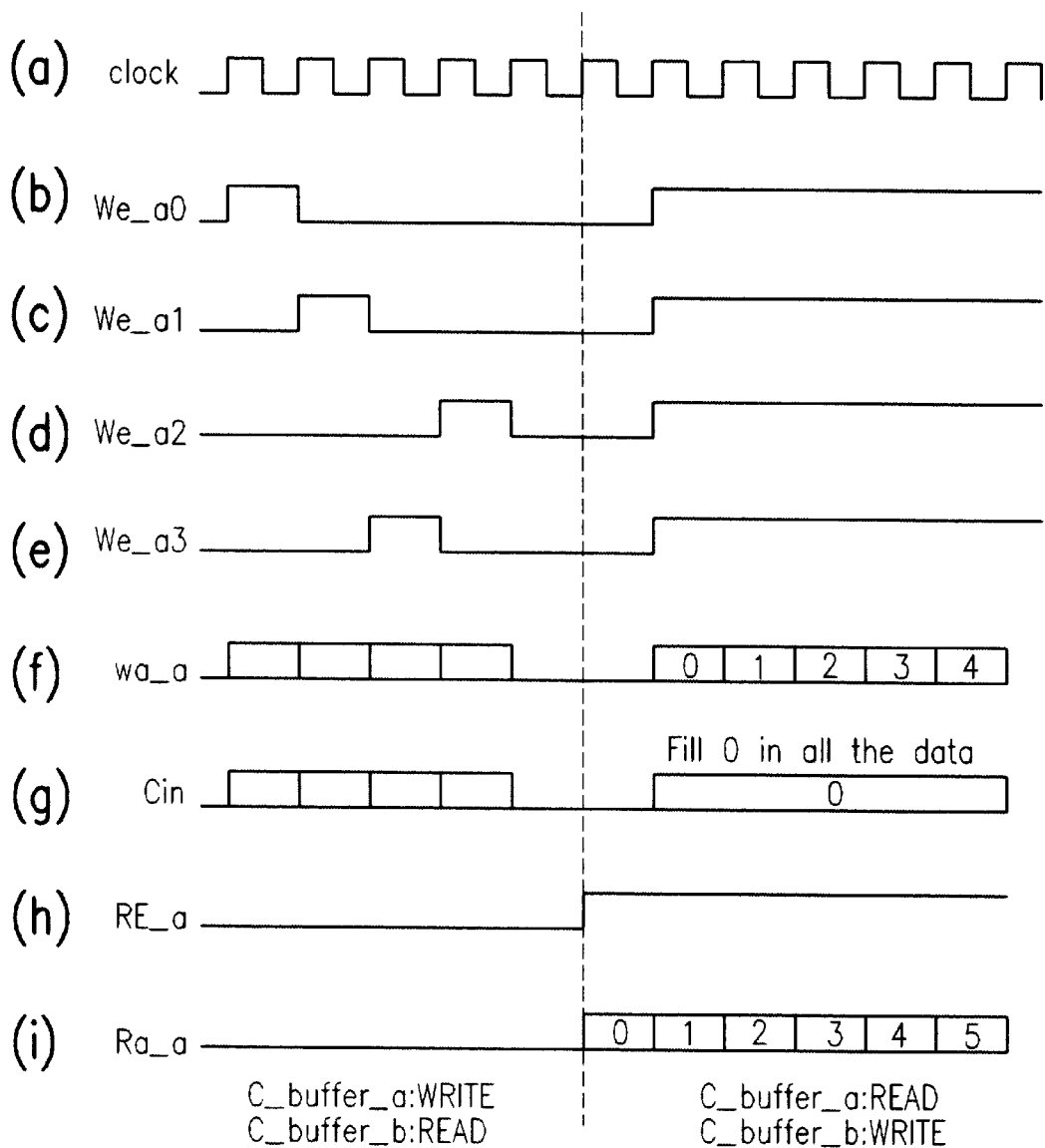

FIG. 6 is a detailed block diagram of an inverse quantizer (IQ) of FIG. 4;

FIG. 7 is a detailed block diagram of a coefficient buffer of FIG. 4;

FIG. 8 is a detailed block diagram of FIG. 7's buffer;

FIG. 9 depicts the inverse scan address generation; and

FIGS. 10(a) to 10(i) are read/write timing charts of the coefficient buffer.

DETAILED DESCRIPTION OF PREFERRED EMBODIMENT

Reference will now be made in detail to the preferred embodiments of the present invention, examples of which are illustrated in the accompanying drawings.

FIG. 4 is a block diagram of a video decoder for high picture quality in accordance with the present invention. A VLD 41 that separates motion vector, quantization value, DCT coefficients from a video bit stream to produce a run-level pair. An index decoder 42 stores run-level pairs output from VLD 41 and produces an index indicative of the number of the level of each run-level pair among 64 coefficients. An IQ 43 performs IQ using the index and the level of index decoder 42. A coefficient buffer 44 produces DCT coefficients serially applied from index decoder 42 and performs an inverse scanning at the same time. An IDCT 45 performs an IDCT with respect to DCT coefficients applied in parallel.

In the preferred embodiments of the present invention, DCT coefficients serially produced from VLD 41 are converted to be applied to IDCT 45, and the inverse quantization and the inverse scanning are performed. The VLD 41 decodes codes corresponding to DCT coefficients of the video bit stream, and produces a run and a level for each code. This run-level value has the following meaning: (run, level) ------ 0's with number of run, one level $$(0,23) \text{ ------ } 23 \quad [\text{ex. 1}]$$

$$(5,8) \text{ ------ } 0,0,0,0,0,8 \quad [\text{ex. 2}]$$

Figure 1:
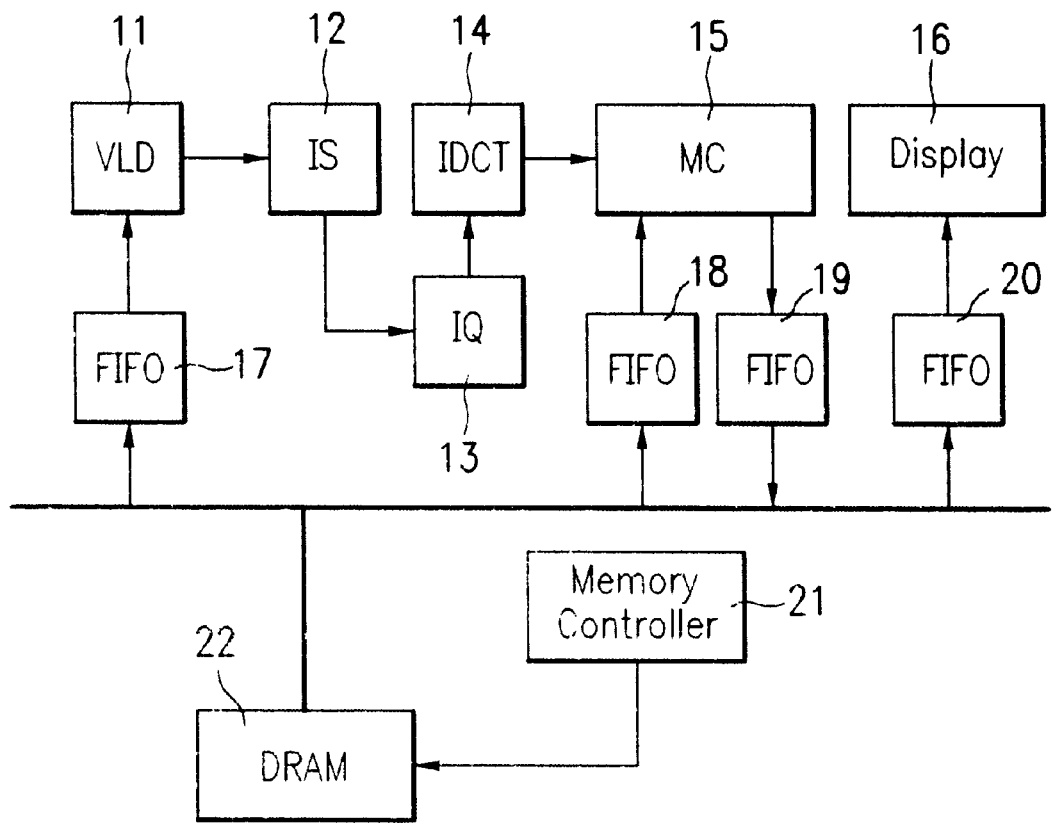
FIG. 1 is a block diagram of a video decoder in accordance with a conventional art.
Figure 2:
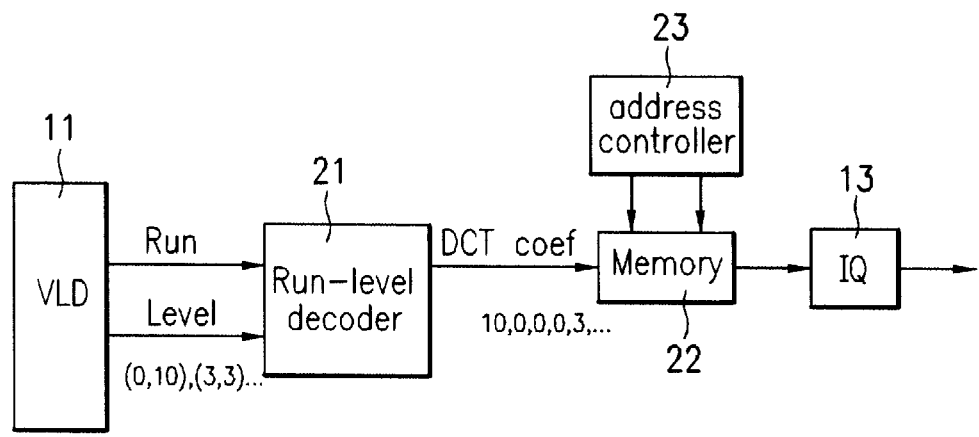
FIG. 2 is a block diagram for run-level decoding and inverse scanning of FIG. 1.
Figure 3A:
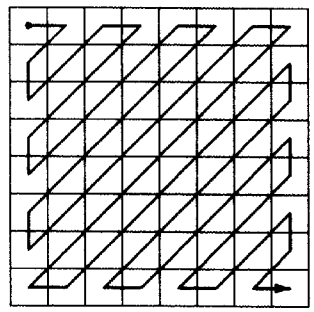
FIGS. 3a and 3b depict a zigzag scanning and a raster scanning, respectively.
Figure 3B:
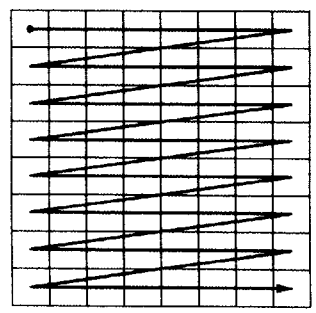

There are 64 coefficients (=8×8) with respect to a single DCT block, and since each code consists of a run-level, run-level pairs produced from a single block are produced by the number of coefficients not 0. For reference, since most DCT coefficients are 0, the run-level pairs generated per block are less than 20 on the average. Such run-level pairs must be converted into DCT coefficients including 64 0's, and the output by the run-level is carried out by zig-zag scanning, as shown in FIG. 3. These coefficients are rearranged in IDCT 45, which is inverse scanning.

The run value of the run-level pairs output from VLD 41 is stored in index decoder 42. Index decoder 42 produces an index indicative of the number of the level of a run-level pair among 64 coefficients. Therefore, this index is one of 0 to 63.

Figure 5:
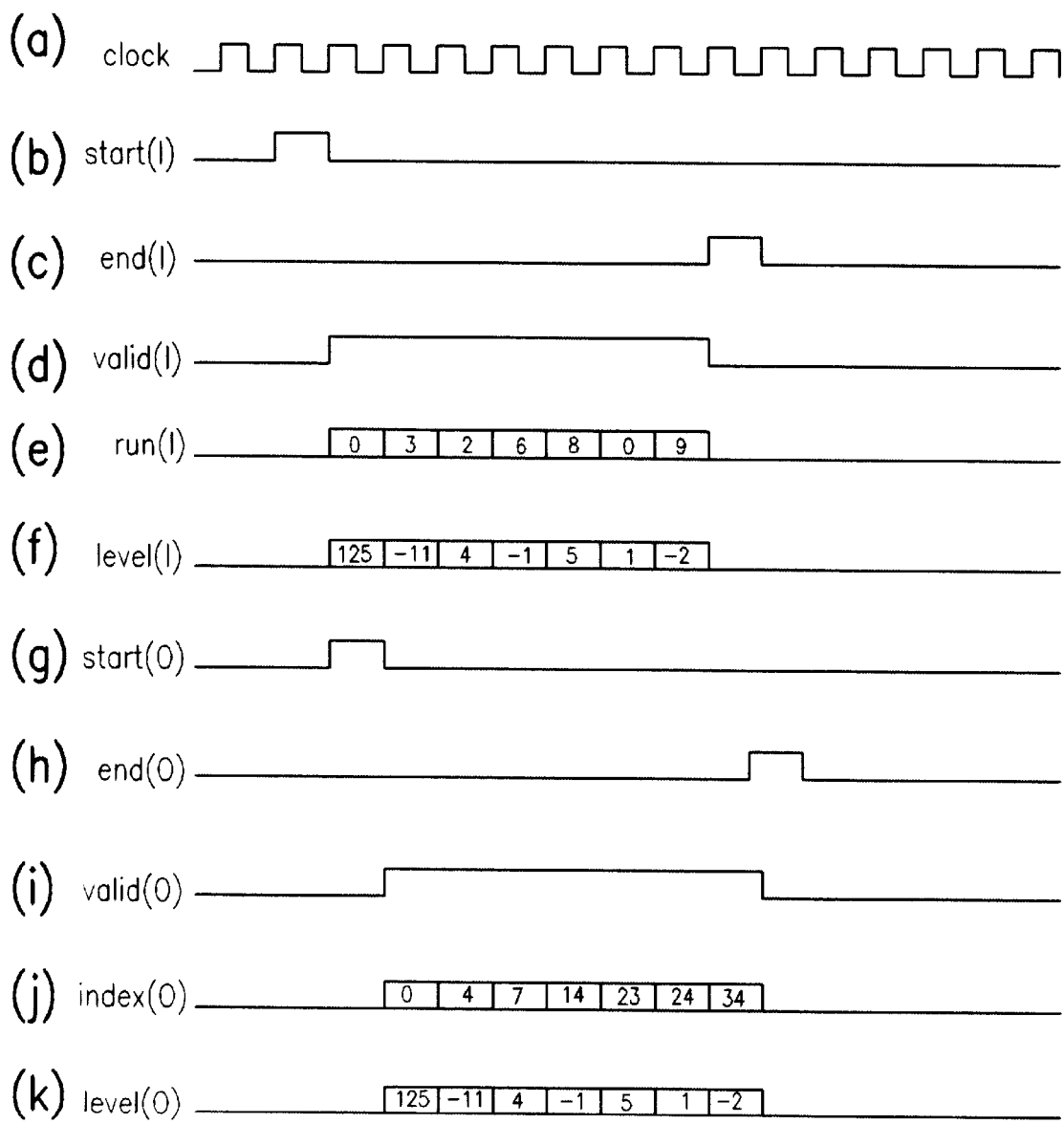

FIGS. 5(a) to 5(k) are input/output wave forms of index decoder 42. FIGS. 5(a) to 5(f), concern signals applied to index decoder 42, FIGS. 5(g) to 5(k) relate to signals output from index decoder 42. When VLD 41 generates a start pulse of FIG. 5(b) synchronized with a clock of FIG. 5(a), a valid signal goes 'high' as shown in FIG. 5(d), and run-level pairs are produced as depicted in FIGS. 5(e) and 5(f). Once an end pulse is generated, the valid signal goes 'low', and run-level pairs are not produced. Index decoder 42 produces signals similarly, as shown in FIGS. 5(g) to 5(k), and its run and index values are a little different from the above. That is, the run value is indicative of the number of 0's between coefficients not 0, and index value is indicative of the number of the level value among the 64 coefficients.

The output DCT coefficients are applied to IQ 43. The IQ 43 multiplies a quantizer level value and quantization matrix to the respective DCT coefficients. The quantizer level is multiplied to the respective 64 coefficients equally, and the value of the quantization matrix is different according to the 8×8 position of the DCT coefficients. Therefore, the position of corresponding one of the coefficients should be found.

The IQ 43 reads an added value of a corresponding position in the quantization matrix from the applied index, and multiplies it to the DCT coefficient.

FIG. 6 is a detailed block diagram of IQ 43, and IQ 43 includes an address converter 61 that converts the index into a read address of the quantization matrix, a memory 62 storing the quantization matrix, and a multiplier 63 multiplying the quantizer level, a level value decoded by VLD 41, and the quantization matrix.

Address converter 61 is used to convert indexes in zigzag order into those in order of quantization matrix memory 62 stored by raster scanning, and multiplier 63 multiplies memory 62's output qm read from the read address generated from address converter 61, the quantizer level, level value produced through index decoder 42, thus producing DCT coefficients coef that will be used as inputs of IDCT 45. The IQ 43 produces start, end, valid, and index signals except DCT coefficients coef. The DCT coefficients produced from IQ 43 are converted in parallel to enhance the processing rate, and simultaneously applied to coefficient buffer 44. The IQ 43 produces coefficients not zero so the volume of its output data is not large, and if 0 is added thereto to be produced to IDCT 45, the volume of data is significantly increased. Thus, when the data is not processed in parallel, high-level clocks are used for the very high processing rate, and heavy load is applied to the hardware. The clock speed can be lowered by processing the 64 coefficients with zero, and in order to do this, coefficient buffer 44 changes data in parallel and performs an inverse scanning by using four memories in parallel.

FIG. 7 is a block diagram of coefficient buffer 44, and buffer 44 includes a first buffer 71 storing coefficients, a second buffer 72, a coefficient buffer controller 73 generating read/write address and read/write enable signals, and a multiplexer 74 selectively producing output data of buffer 44. Two buffers 71 and 72 are used to store coefficients, and coefficients of one block are written in one of them while the previous block is read out of the other buffer. They take their turns in reading and writing for writing the next block. The write address and read address are produced from buffer controller 73. Each one of the coefficients is written into the respective four memories of each buffer, and four coefficients each written into four memories are simultaneously read, thus producing serially applied data in parallel. Write enable signals we_a[3:0], and write addresses wa_a,wa_b are produced by using the valid and index signals.

FIG. 8 is a detailed block diagram of first and second buffers 71 and 72, and each buffer includes four memories 81 to 84. Applied data DI and write address WA are connected in common to four memories 81 to 84. Write enable signals we0, we1, we2, and we3 are each connected to four memories 81 to 84 so writing into the memories is selectively performed. Read address RA is commonly connected to the memories so reading from four memories 81 to 84 is simultaneously performed.

A method of generating address and enable signals from buffer controller 73 is as follows. Basically, when writing a DCT coefficient into one coefficient buffer, the other coefficient buffer inserts 0 in a position from which data has been already read, simultaneously with reading already written DCT coefficients, so there is no need to purposely insert 0 into the memory prior to writing of the next block. Each buffer 71 and 72 consists of four memories for storing data of 8×8 blocks divided into four. Buffer controller 73 detects the position of the DCT coefficient applied by using the index signal produced from IQ 43, and determines into which one of four memories and into which address the DCT coefficient is written and writes corresponding memory's address, thus performing inverse scanning.

FIG. 9 shows a method of converting the index signal from IQ 43 into the coefficient buffer's address. To read the index signals, applied in zigzag scanning order, in raster scanning, indexes of the respective coefficient are divided into WA and We and converted. If index is 23, signal wel of the corresponding buffer is enabled, and 5, a DCT coefficient, is written into a fourth address (WA=3) of memory 82 enabled by signal wel. Since the value other than the written data has been already filled with 0, all the 64 coefficients can be read out.

FIGS. 10(a) to 10(i) are timing charts of signals controlling first buffer 71 of two buffers, and two buffers 71 and 72 take their turns in reading and writing. The signals are generated from write address wa_a for writing, and 16 data are consecutively read out per block for reading. A write address and write enable signal are generated in the position of the read data so as to write 0 at the next clock. That is, when writing data into first buffer 71, data is read from second buffer 72, and when writing data into second buffer 72, data is read from first buffer 71. The buffer reading the data writes 0 in the position where the data is read out. That is, reading is performed in one buffer 71 or 72, and write can be performed in both buffers 71 and 72. Outputs of first and second buffers 71 and 72 are selected by multiplexer 74, and are transmitted to IDCT 45 by four coefficients. IDCT 45 performs an inverse IDCT in the unit of 8×8. The MPEG standards propose two-dimensional IDCT of 8×8 block. One dimensional IDCT with respect to the applied data is performed, and after column-row preposition, one-dimensional IDCT is performed, thereby completing 8×8 two-dimensional IDCT. Coefficients produced from VLD 41 are converted into parallel data filled with 0 to be applied to IDCT 45 as the IQ and inverse scanning are performed, so the high speed data processing can be assured.

When the present invention is applied to a video decoder for high definition television requiring the data processing volume and processing rate, IQ/inverse scanning/IDCT can be performed at high speed with the VLD operating at low speed. In conclusion, the present invention can reduce circuits and is realized with appropriate clocks compared to a conventional video decoder, and the video decoder can be integrated in one integrated circuit.

The processing time can be reduced because there is no need to perform IQ with respect to 0 by performing IQ with the position information on the 8×8 block of the coefficient decoded from a given run without producing 0 by using the run-level decoder with respect to the run-level of the coefficient decoded after VLD.

In addition, serial data can be converted into parallel data simultaneously with performing the inverse scanning by producing the write address of the coefficient memory arranged in parallel by using the position information of coefficients from the VLD with storing the inversely quantized DCT coefficient in the memory, so the clock rate may be decreased not to apply heavy load to the hardware.

64 coefficients with 0 can be all produced by the use of only coefficients not zero by inserting 0 into the memory prior to writing coefficients not 0 into the memory for generating 64 coefficients per block, thus increasing the processing rate.

It will be apparent to those skilled in the art that various modifications and variations can be made in the video decoder of the present invention without departing from the spirit or scope of the invention. Thus, it is intended that the present invention cover the modifications and variations of this invention provided they come within the scope of the appended claims and their equivalents.

What is claimed is:

1. A video decoder for high definition television comprising:

a variable length decoder decoding codes corresponding to discrete cosine transform (DCT) coefficients of an applied video bit stream, and producing a run-level pair for each code;

an index decoder storing run-level pairs produced from the variable length decoder, and producing the position information indicating the number of a level value of a corresponding run-level pair among the DCT coefficients;

an inverse quantizer obtaining an added value corresponding to the position information of the index decoder from a quantization matrix, and performing an inverse quantization for the DCT coefficients by multiplying a quantizer level for determining a quantization step and a corresponding DCT coefficient to the added value;

an inverse scanner including a plurality of memories, and inversely scanning the DCT coefficients inversely quantized and received serially from the inverse quantizer, wherein the inverse scanner produces the DCT coefficients in parallel at the same time, and wherein the inverse scanner comprises, first and second buffers storing the DCT coefficients inversely quantized, a coefficient buffer controller generating a write/read address and a write/read enable signal to the first and second buffers, and a multiplexer selectively producing parallel output data received from the first and second buffers being the parallel DCT coefficients; and an inverse discrete cosine transformer performing an inverse discrete cosine transformation (IDCT) of the DCT coefficients received in parallel from the inverse scanner.

2. The video decoder according to claim 1, wherein the inverse quantizer includes:

an address converter converting the position information produced from the index decoder into a read address of the quantization matrix;

a memory storing the quantization matrix and producing a quantization matrix added value in the read address produced from the address converter; and a multiplier multiplying a quantization level determining the quantization step, the DCT coefficient produced through the index decoder, and quantization matrix added value produced from the memory.

3. The video decoder according to claim 2, wherein the address converter converts the position information in zig-zag scanning order into data in order of the memory stored by raster scanning.

4. The video decoder according to claim 1, wherein the inverse scanner finds the position of the DCT coefficient inversely quantized by using the applied position information signal, and performs an inverse scanning by a corresponding address of a corresponding one of plural memories.

5. The video decoder according to claim 1, wherein when one of the first and second buffers is writing coefficients of the current block, the other buffer reads the previous block, and if completing the writing and reading, they take their turns in writing and reading.

6. The video decoder according to claim 1, wherein the first and second buffers each consist of a plurality of memories and selectively write applied data into the memories by providing a different write enable signal to each memory while commonly providing data and write address to the plural memories, and commonly applies the read address and read enable signal to a plurality of the memories, thus reading data out of the memories at the same time, and producing the data in parallel.

7. The video decoder according to claim 1, wherein the buffer controller generates a write/read address and a write/read enable signal of the memories by using valid and index signals to write the inversely quantized DCT coefficients into a plurality of the memories one by one, and to simultaneously read the DCT coefficients from the memories.

8. The video decoder according to claim 1, wherein the buffer controller generates the write/read address and the write enable signal to write 0 into a position where the data is read, simultaneously with reading the data from one coefficient buffer.

9. The video decoder according to claim 1, wherein when reading data from one coefficient buffer, 64 DCT coefficients with 0 that have been already written are all read out.

* * * * *